US012136830B2

(12) United States Patent
Jang (10) Patent No.: US 12,136,830 B2
(45) Date of Patent: Nov. 5, 2024

(54) ANTENNA MODULE FOR WIRELESS POWER TRANSMISSION AND RECEPTION (71) Applicant: AMOSENSE CO., LTD, Cheonan-si (KR)

(72) Inventor: Kiljae Jang, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 150 days.

(21) Appl. No.: 17/799,669

(22) PCT Filed: Jan. 19, 2021

(86) PCT No.: PCT/KR2021/000721
§ 371 (c)(1),
(2) Date: Aug. 13, 2022

(87) PCT Pub. No.: WO2021/162261
PCT Pub. Date: Aug. 19, 2021

(65) Prior Publication Data
US 2023/0076064 A1 Mar. 9, 2023

(30) Foreign Application Priority Data
Feb. 13, 2020 (KR) .................. 10-2020-0017721

(51) Int. Cl.
H02J 50/20 (2016.01)
H02J 50/00 (2016.01)
H01Q 1/24 (2006.01)

(52) U.S. Cl.
CPC ............ *H02J 50/20* (2016.02); *H02J 50/005* (2020.01); *H01Q 1/243* (2013.01)

(58) Field of Classification Search
CPC ......... H02J 50/20; H02J 50/005; H01Q 1/243
(Continued)

(56) References Cited

U.S. PATENT DOCUMENTS 9,634,392 B2  4/2017  Saito et al.
10,547,098 B2  1/2020  Lee et al.
(Continued)

FOREIGN PATENT DOCUMENTS

CN  104465067 A  3/2015
CN  206931708 U  1/2018
(Continued)

OTHER PUBLICATIONS

CN Office Action dated Jun. 17, 2023 as received in Application No. 202180014634.0.

*Primary Examiner* — Alfonso Perez Borroto
(74) *Attorney, Agent, or Firm* — Maschoff Brennan (57) ABSTRACT Disclosed is an antenna module for wireless power transmission and reception, wherein a loop-shaped coil for wireless power transmission and reception is formed using two wires having different diameters, so that a reduction in charging efficiency is prevented. The disclosed antenna module for wireless power transmission and reception may comprise: a first coil which is wound around a first winding shaft to form a first loop and has a first coil diameter; a second coil which is wound around the outer periphery of the first coil to form a second loop and has a second coil diameter thicker than the first oil diameter; a base substrate disposed to overlap portions of the first coil and the second coil; and a coil connection pattern formed on one surface of the base substrate and connected to the first coil and the second coil.

12 Claims, 6 Drawing Sheets (58) Field of Classification Search
USPC ............................................. 307/149
See application file for complete search history.

(56) References Cited

U.S. PATENT DOCUMENTS

| | | | |
|---|---|---|---|
| 11,329,370 B2 | 5/2022 | Jang et al. | |
| 2017/0040105 A1* | 2/2017 | Peralta | H01F 38/14 |
| 2017/0040107 A1* | 2/2017 | Peralta | H02J 7/00034 |
| 2017/0040688 A1* | 2/2017 | Peralta | H01F 41/04 |
| 2017/0040692 A1* | 2/2017 | Peralta | H02J 50/80 |
| 2017/0040693 A1* | 2/2017 | Luzinski | H04B 5/43 |
| 2017/0040695 A1* | 2/2017 | Rajagopalan | H02J 50/10 |
| 2019/0097461 A1* | 3/2019 | Singh | H01F 38/14 |
| 2021/0005961 A1* | 1/2021 | Jang | H04B 5/79 |

FOREIGN PATENT DOCUMENTS

| | | |
|---|---|---|
| CN | 108336487 A | 7/2018 |
| KR | 10-2015-0010063 A | 1/2015 |
| KR | 10-1491472 B1 | 2/2015 |
| KR | 10-2018-0050279 A | 5/2018 |
| KR | 10-2019-0111533 A | 10/2019 |
| WO | 2019/182283 A1 | 9/2019 |

\* cited by examiner

ANTENNA MODULE FOR WIRELESS POWER TRANSMISSION AND RECEPTION

TECHNICAL FIELD

The present disclosure relates to an antenna module for wireless power transmission and reception, and more specifically, to an antenna module for wireless power transmission and reception for performing wireless power transmission and wireless power reception.

BACKGROUND ART

With the advancement of a technology, a short-range communication function and a wireless power reception (or wireless charging) function are being applied to portable terminals. In other words, the portable terminals transmit and receives data to and from other electronic devices using a short-range communication (e.g., NFC) function, and charge a built-in battery using the wireless power reception (or wireless charging) function.

Recently, the application of a technology for charging wearable devices using the portable terminals has been studied, and wearable devices and portable terminals capable of charging other portable terminals are being released as products.

Accordingly, various antenna structures are being studied for the portable terminals to improve the efficiency of charging the wearable devices while providing the wireless power reception and wireless power transmission functions.

SUMMARY OF INVENTION

Technical Problem

The present disclosure has been proposed in consideration of the above circumstances, and an object of the present disclosure is to provide an antenna module for wireless power transmission and reception, which prevents a reduction in charging efficiency by forming a loop-shaped coil for wireless power transmission and reception using two wires having different diameters. In other words, the object of the present disclosure is to prevent the reduction in charging efficiency of a wearable device while improving an internal inductance of a loop coil by disposing a loop coil having a diameter (line width) smaller than a loop coil inside the loop coil.

Solution to Problem

In order to achieve the object, an antenna module for wireless power transmission and reception according to an embodiment of the present disclosure includes a first coil that is wound around a first winding shaft to form a first loop, and having a first coil diameter, a second coil that is wound around an outer circumference of the first coil to form a second loop, and having a second coil diameter greater than the first coil diameter, a base substrate disposed to overlap at least parts of the first coil and the second coil, and a coil connection pattern formed on one surface of the base substrate, and connecting the first coil and the second coil.

At this time, a first end of the second coil and a second end of the first coil may be spaced apart from each other, and disposed to face each other. The coil connection pattern may be disposed on one surface facing the first coil and the second coil among an upper surface and a lower surface of the base substrate, and the coil connection pattern may be soldered with a second end of the first coil and a first end of the second coil. The first loop may be disposed in an inner circumferential area of the second loop.

The antenna module for wireless power transmission and reception according to an embodiment of the present disclosure may further comprise a first terminal connection pattern formed on the base substrate, and having a first end connected to a first end of the first coil disposed in an inner circumferential area of the first loop, a second terminal connection pattern formed on the base substrate, and having a first end connected to a second end of the second coil disposed in an outer circumferential area of the second loop, a first terminal pattern formed on the base substrate, and connected to a second end of the first terminal connection pattern, and a second terminal pattern formed on the base substrate, and connected to a second end of the second terminal connection pattern.

The antenna module for wireless power transmission and reception according to an embodiment of the present disclosure may further comprise a radiation pattern formed on the base substrate, and disposed to be spaced apart from the first coil and the second coil, and the radiation pattern may have a loop shape that is wound around a second winding shaft spaced apart from the first winding shaft.

The antenna module for wireless power transmission and reception according to an embodiment of the present disclosure may further comprise a third terminal connection pattern formed on the base substrate, and having a first end connected to a first end of the radiation pattern, a fourth terminal connection pattern formed on the base substrate, and having a first end connected to a second end of the radiation pattern, a third terminal pattern formed on the base substrate, and connected to a second end of the third terminal connection pattern, and a fourth terminal pattern formed on the base substrate, and connected to a second end of the fourth terminal connection pattern.

The first coil may be a wire having the first coil diameter smaller than that of the second coil, and the second coil may be a wire having the second coil diameter greater than that of the first coil.

Advantageous Effects of Invention

According to the present disclosure, to the antenna module for wireless power transmission and reception can prevent the reduction in charging efficiency upon wireless power transmission for charging the wearable device by disposing the second loop coil having the second coil diameter greater than the first coil diameter along the outer circumference of the first loop coil having the first coil diameter, and connecting the first coil and the second coil through the coil connection pattern formed on the base substrate to form the coil for wireless power transmission and reception.

In addition, the antenna module for wireless power transmission and reception can improve efficiency when charging the wearable device while improving the internal inductance of the loop coil by forming the loop-shaped coil for wireless power transmission and reception using the two wires having different diameters, and forming the diameter of the coil on a partial inner circumference of the loop coil to be relatively smaller.

DESCRIPTION OF EMBODIMENTS

Hereinafter, the most preferred embodiments of the present disclosure will be described with reference to the accompanying drawings in order to specifically describe the embodiments so that those skilled in the art to which the present disclosure pertains can easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function can obscure the gist of the present disclosure, the detailed description thereof will be omitted.

Figure 1:
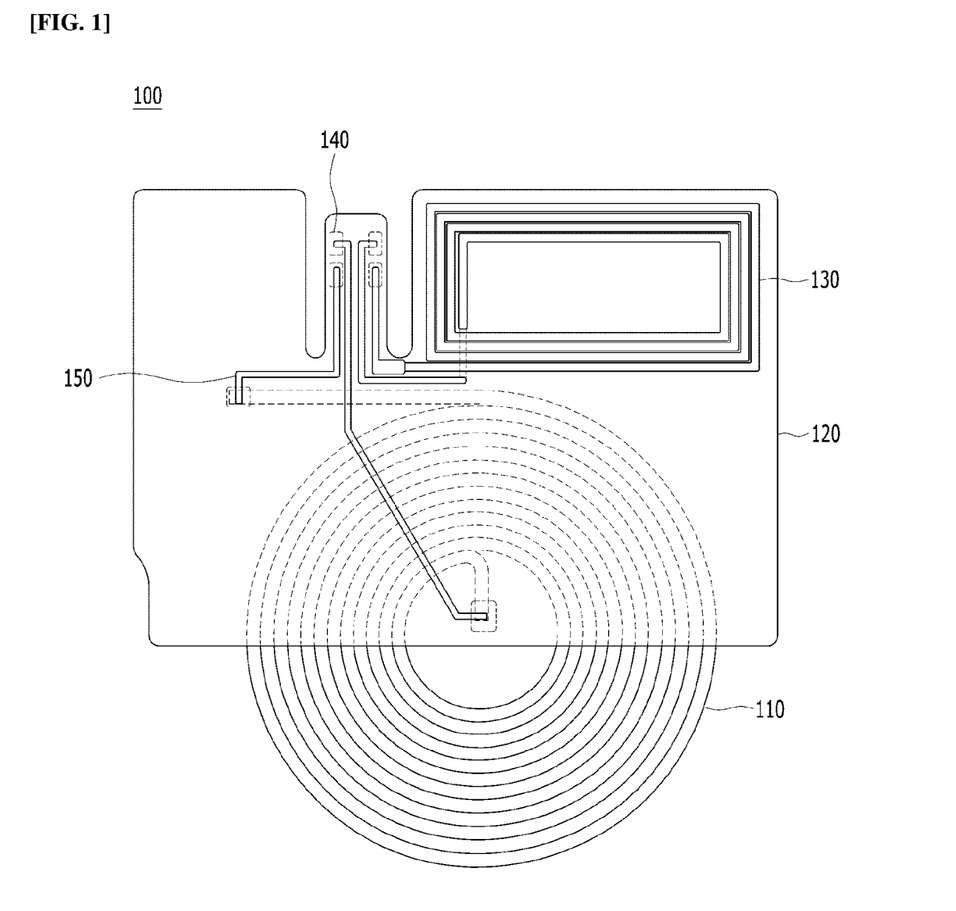
FIG. 1 is a view for describing an antenna module for wireless power transmission and reception according to a first embodiment of the present disclosure.
Figure 2:
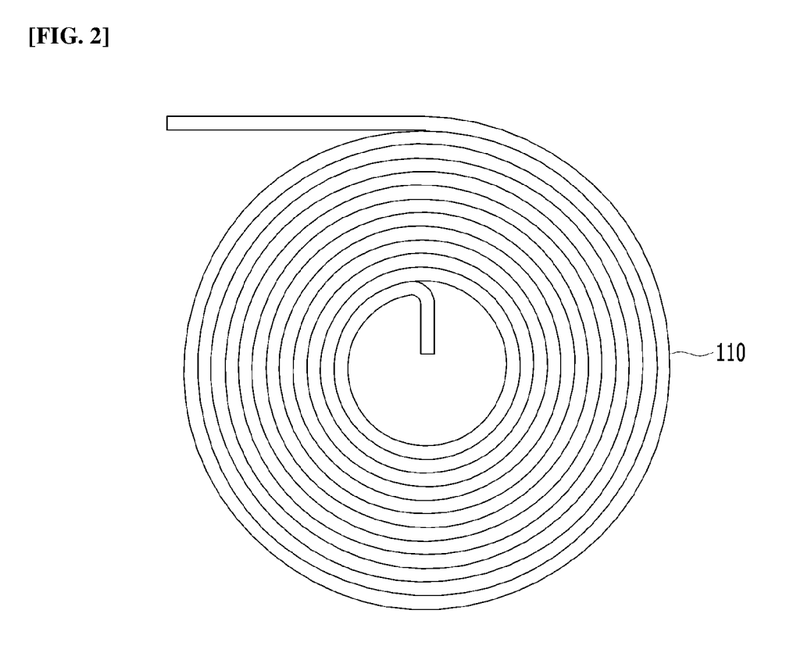
FIG. 2 is a view for describing a coil for wireless power transmission and reception in FIG. 1.
Figure 3:
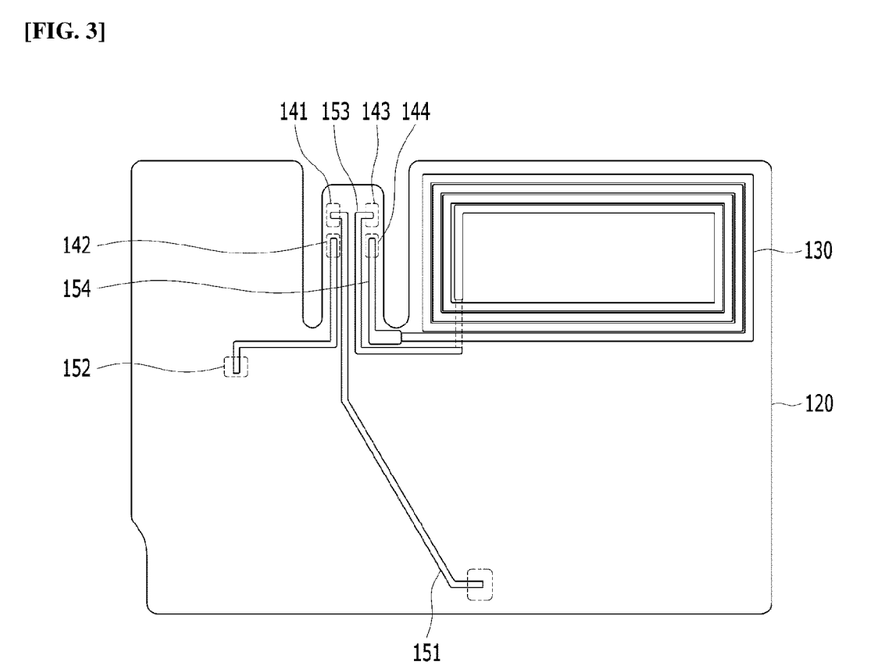
FIG. 3 is a view for describing a base substrate, a radiation pattern for short-range communication, a terminal pattern, and a terminal connection pattern in FIG. 1.

Referring to FIGS. 1 to 3, an antenna module 100 for wireless power transmission and reception according to a first embodiment of the present disclosure is configured to include a coil 110 for wireless power transmission and reception, a base substrate 120, a radiation pattern 130 for short-range communication, a terminal pattern 140, and a terminal connection pattern 150.

The coil 110 for wireless power transmission and reception is a flat type coil configured as a loop-shaped wire. The coil 110 for wireless power transmission and reception is formed in a loop shape in which a wire having a predetermined diameter (line width) is wound around a first winding shaft a plurality of times. Here, the first winding shaft may be a virtual axis vertically passing through the base substrate 120.

The base substrate 120 is configured as a thin film substrate such as a film, a sheet, or a thin film substrate. The base substrate 120 may be a flexible printed circuit board (FPCB). As an example, the base substrate 120 is a polypropylene (PP) sheet. Here, the base substrate 120 is not limited thereto, and may be variously used as long as it is a thin film substrate and may form the radiation pattern 130 for short-range communication constituting the antenna.

The base substrate 120 is disposed above the coil 110 for wireless power transmission and reception. At this time, the base substrate 120 is disposed to partially overlap the coil 110 for wireless power transmission and reception above the coil 110 for wireless power transmission/reception. Accordingly, a part of the coil 110 for wireless power transmission and reception is exposed to the outside without overlapping the base substrate 120.

The radiation pattern 130 for short-range communication is a pattern for near field communication (NFC), and formed on at least one of upper and lower surfaces of the base substrate 120. At this time, the radiation pattern 130 for short-range communication is disposed in an area that does not overlap the coil 110 for wireless power transmission and reception among the entire area of the base substrate 120.

The radiation pattern 130 for short-range communication is formed in a loop shape that is wound around a second winding shaft a plurality of times. Here, the second winding shaft may vertically pass through the base substrate 120, and may be a virtual axis spaced apart from the above-described first winding shaft.

The terminal pattern 140 is a pattern used as a terminal for connecting an internal circuit of an electronic device and the antenna module 100 for wireless power transmission and reception, and formed on at least one of the upper and lower surfaces of the base substrate 120. The terminal pattern 140 is configured to include a first terminal pattern 141 and a second terminal pattern 142 for connecting the coil 110 for wireless power transmission and reception with the internal circuit of the electronic device, and a third terminal pattern 143 and a fourth terminal pattern 144 for connecting the radiation pattern 130 for short-range communication to the internal circuit of the electronic device.

The terminal connection pattern 150 is formed on the base substrate 120. The terminal connection pattern 150 includes a first terminal connection pattern 151 and a second terminal connection pattern 152 for connecting the coil 110 for wireless power transmission and reception and the terminal pattern 140, and a third terminal connection pattern 153 and a fourth terminal connection pattern 154 for connecting the radiation pattern 130 for short-range communication and the terminal pattern 140.

The first terminal connection pattern 151 connects a first end of the coil 110 for wireless power transmission and reception to the first terminal pattern 141. A first end of the first terminal connection pattern 151 is connected to the first end of the coil 110 for wireless power transmission and reception, and a second end of the first terminal connection pattern 151 is connected to the first terminal pattern 141.

The second terminal connection pattern 152 connects a second end of the coil 110 for wireless power transmission and reception to the second terminal pattern 142. A first end of the second terminal connection pattern 152 is connected to the second end of the coil 110 for wireless power transmission, and a second end of the second terminal connection pattern 152 is connected to the second terminal pattern 142.

The third terminal connection pattern 153 connects the radiation pattern 130 for short-range communication and the third terminal pattern 143. A first end of the third terminal connection pattern 153 is connected to a first end of the radiation pattern 130 for short-range communication, and a second end of the third terminal connection pattern 153 is connected to the third terminal pattern 143.

The fourth terminal connection pattern 154 connects the radiation pattern 130 for short-range communication and the fourth terminal pattern 144. A first end of the fourth terminal connection pattern 154 is connected to the second end of the radiation pattern 130 for short-range communication, and a second end of the fourth terminal connection pattern 154 is connected to the fourth terminal pattern 144.

Here, in the embodiment of the present disclosure, although it has been described as an example that the terminal connection pattern 150 is composed of the first to fourth terminal patterns 141 to 144, the terminal connection pattern 150 may also be composed of five or more terminal patterns 140 depending on the shape, arrangement position, or the like of the radiation pattern 130 for short-range communication.

When the antenna module 100 for wireless power transmission and reception according to the first embodiment of the present disclosure operates the coil 110 for wireless power transmission and reception in a transmission (Tx) mode for charging the wearable device, the charging efficiency of the wearable device may be reduced.

Accordingly, the antenna module 100 for wireless power transmission and reception according to a second embodiment of the present disclosure forms the loop-shaped coil 110 for wireless power transmission and reception using two wires having different diameters (line widths), thereby solving the problem in that the charging efficiency is reduced.

Figure 4:
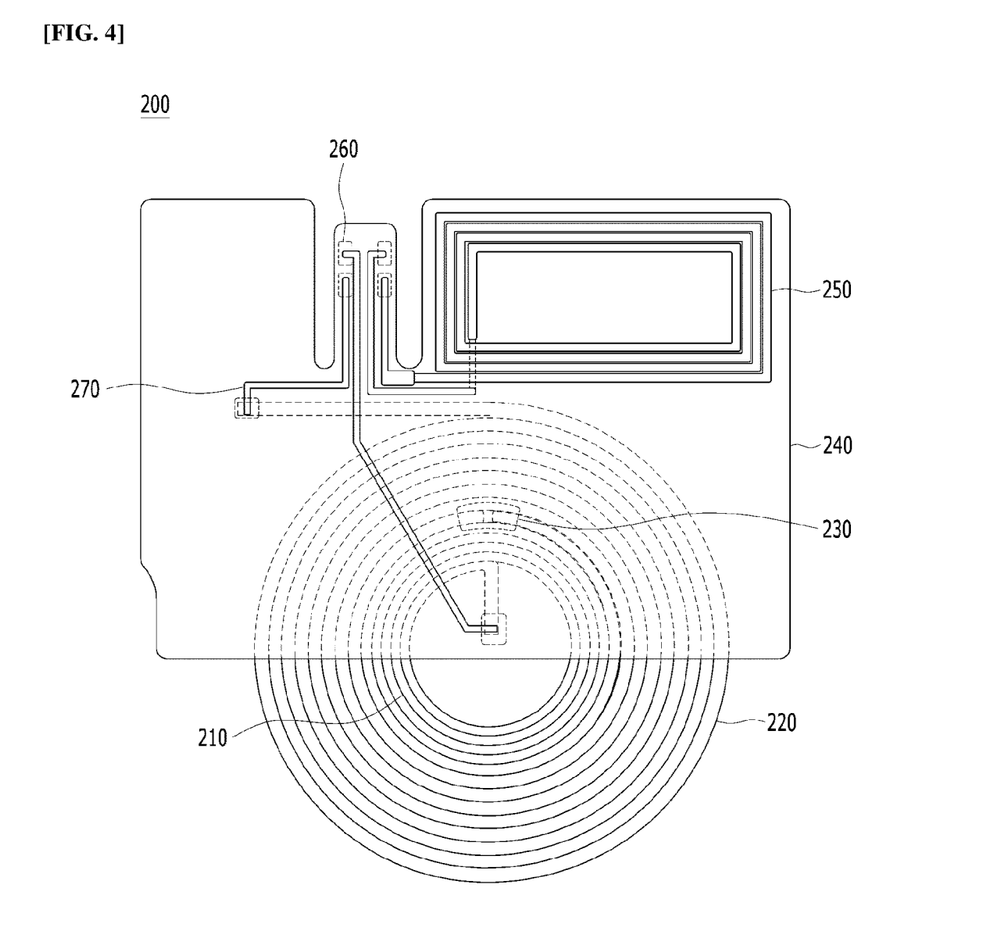
FIG. 4 is a view for describing an antenna module for wireless power transmission and reception according to a second embodiment of the present disclosure.
Figure 5:
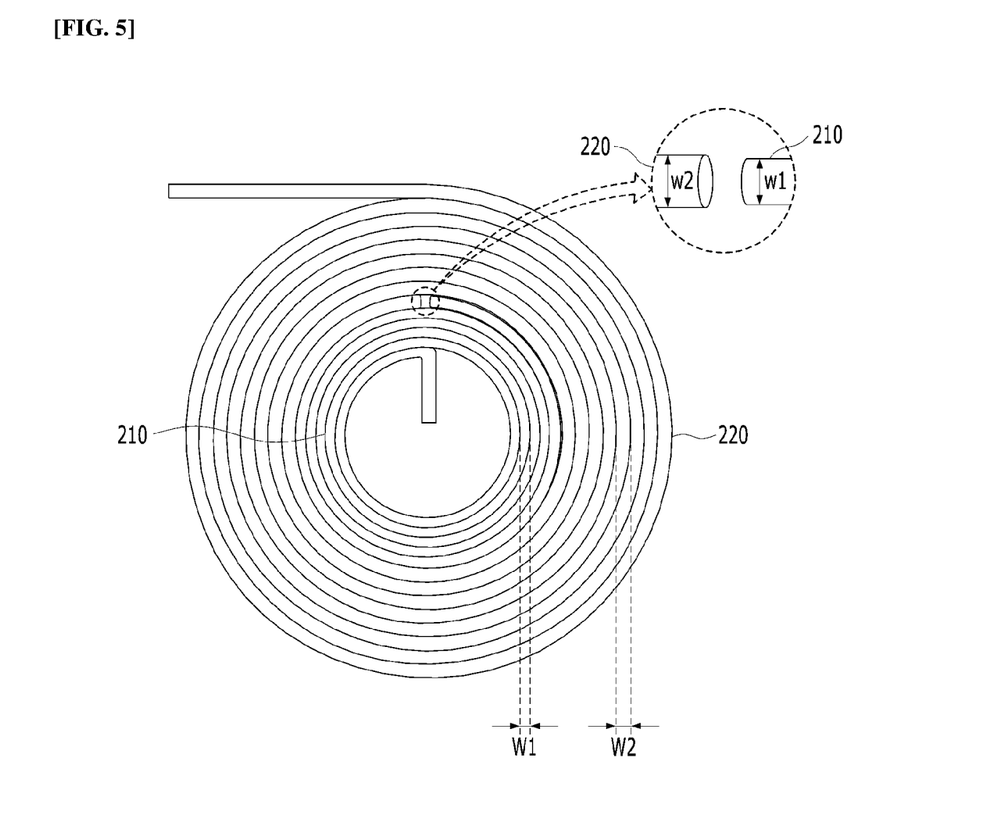
FIG. 5 is a view for describing a coil for wireless power transmission and reception in FIG. 4.
Figure 6:
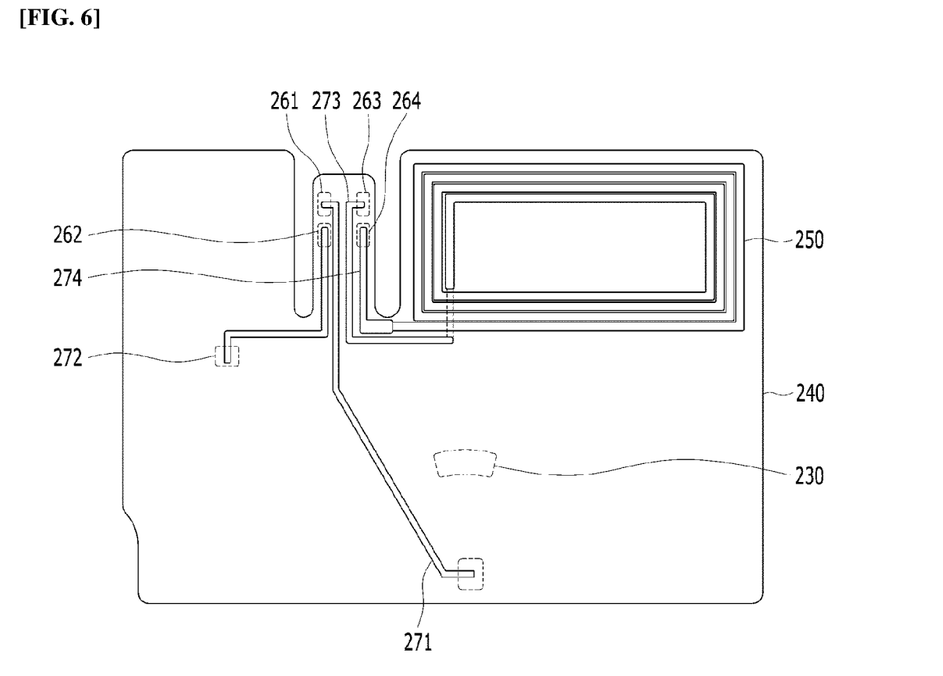
FIG. 6 is a view for describing a base substrate, a coil connection pattern, a radiation pattern for short-range communication, a terminal pattern, and a terminal connection pattern in FIG. 4.

Referring to FIGS. 4 to 6, the antenna module 200 for wireless power transmission and reception according to the second embodiment of the present disclosure is configured to include a first coil 210 for wireless power transmission and reception, a second coil 220 for wireless power transmission and reception, a base substrate 230, a coil connection pattern 240, a radiation pattern 250 for short-range communication, a terminal pattern 260, and a terminal connection pattern 270.

The first coil 210 for wireless power transmission and reception is a flat type coil configured as a wire having a first coil diameter W1. The first coil 210 for wireless power transmission and reception is wound around a first winding shaft a plurality of times to form a first loop. Here, the first winding shaft may be a virtual axis vertically passing through the base substrate 230. As an example, the first coil 210 for wireless power transmission and reception forms a first loop that is wound around the first winding shaft about 6 times.

A first end of the first coil 210 for wireless power transmission and reception is disposed in an inner circumferential area of the first loop, and connected to the terminal pattern 260 through the terminal connection pattern 270 to be described below. A second end of the first coil 210 for wireless power transmission and reception is disposed on an outer circumferential area of the first loop, and spaced apart from a first end of the second coil 220 for wireless power transmission and reception by a predetermined interval and disposed to face the first end of the second coil 220 for wireless power transmission and reception.

The second coil 220 for wireless power transmission and reception is a flat type coil configured as a wire having a second coil diameter W2. The second coil 220 for wireless power transmission and reception is wound a plurality of times along an outer circumference of the first loop formed by the first coil 210 for wireless power transmission and reception to form a second loop.

At this time, the wire constituting the second coil 220 for wireless power transmission and reception has a greater diameter than the wire constituting the first coil 210 for wireless power transmission and reception, and the second coil diameter W2 is a diameter greater than the first coil diameter W1.

A first end of the second coil 220 for wireless power transmission and reception is disposed in an inner circumferential area of the second loop, and spaced apart from a second end of the first coil 210 for wireless power transmission and reception by a predetermined interval and disposed to face the first end of the second coil 220 for wireless power transmission and reception. A second end of the second coil 220 for wireless power transmission and reception is disposed in an outer circumferential area of the second loop, and connected to the terminal pattern 260 through the terminal connection pattern 270 to be described below.

The base substrate 230 is configured as a thin film substrate such as a film, a sheet, or a thin film substrate. The base substrate 230 may be a flexible printed circuit board (FPCB). As an example, the base substrate 230 is a polypropylene (PP) sheet. Here, the base substrate 230 is not limited thereto, and may be variously used as long as it is a thin film substrate and may form the radiation pattern 250 for short-range communication constituting the antenna.

The base substrate 230 is disposed above the coil for wireless power transmission and reception. At this time, the base substrate 230 is disposed to partially overlap the coil for wireless power transmission and reception above the coil for wireless power transmission and reception. Accordingly, a part of the coil for wireless power transmission and reception is exposed to the outside without overlapping the base substrate 230.

The coil connection pattern 240 is formed on one surface of the base substrate 230. The coil connection pattern 240 is formed on one surface of the base substrate 230 that comes into contact with the first coil 210 for wireless power transmission and reception and the second coil 220 for wireless power transmission and reception among upper and lower surfaces of the base substrate 230.

The coil connection pattern 240 may be formed on the surface of the base substrate 230 through a printing process or the like. The coil connection pattern 240 may be formed together with other patterns (the terminal pattern 260 and the terminal connection pattern 270), and formed in a form exposed to the outside as a coverlay film in which an area corresponding to the coil connection pattern 240 is removed is bonded.

The coil connection pattern 240 is disposed to overlap the second end of the first coil 210 for wireless power transmission and reception and the first end of the second coil 220 for wireless power transmission and reception. In other words, the coil connection pattern 240 is electrically connected to the second end of the first coil 210 for wireless power transmission and reception and the first end of the second coil 220 for wireless power transmission and reception through soldering.

The radiation pattern 250 for short-range communication is a pattern for near field communication (NFC), and formed on at least one of upper and lower surfaces of the base substrate 230. At this time, the radiation pattern 250 for short-range communication is disposed in an area that does not overlap the coil for wireless power transmission and reception among the entire area of the base substrate 230.

The radiation pattern 250 for short-range communication is formed in a loop shape that is wound around a second winding shaft a plurality of times. Here, the second winding shaft may vertically pass through the base substrate 230, and may be a virtual axis spaced apart from the above-described first winding shaft.

The terminal pattern 260 is a pattern used as a terminal for connecting an internal circuit of an electronic device and the antenna module 200 for wireless power transmission and reception, and formed on at least one of the upper and lower surfaces of the base substrate 230. The terminal pattern 260 is configured to include a first terminal pattern 261 for connecting the first coil 210 for wireless power transmission and reception to an internal circuit of an electronic device, a second terminal pattern 262 for connecting the first coil 210 for wireless power transmission and reception to the internal circuit of the electronic device, and a third terminal pattern 263 and a fourth terminal pattern 264 for connecting the radiation pattern 250 for short-range communication to the internal circuit of the electronic device.

The terminal connection pattern 270 is formed on the base substrate 230. The terminal connection pattern 270 includes a first terminal connection pattern 271 for connecting the first coil 210 for wireless power transmission and reception and the terminal pattern 260, a second terminal connection pattern 272 for connecting the second coil 220 for wireless power transmission and reception and the terminal pattern 260, and a third terminal connection pattern 273 and a fourth terminal connection pattern 274 for connecting the radiation pattern 250 for short-range communication and the terminal pattern 260.

The first terminal connection pattern 271 connects the first end of the first coil 210 for wireless power transmission and reception and the first terminal pattern 261. A first end of the first terminal connection pattern 271 is connected to the first end of the coil pattern for wireless power transmission and reception, and a second end of the first terminal connection pattern 271 is connected to the first terminal pattern 261.

The second terminal connection pattern 272 connects the second end of the second coil 220 for wireless power transmission and reception and the second terminal pattern 262. A first end of the second terminal connection pattern 272 is connected to the second end of the second coil 220 for wireless power transmission and reception, and a second end of the second terminal connection pattern 272 is connected to the second terminal pattern 262.

The third terminal connection pattern 273 connects the radiation pattern 250 for short-range communication and the third terminal pattern 263. A first end of the third terminal connection pattern 273 is connected to the first end of the radiation pattern 250 for short-range communication, and a second end of the third terminal connection pattern 273 is connected to the third terminal pattern 263.

The fourth terminal connection pattern 274 connects the radiation pattern 250 for short-range communication and the fourth terminal pattern 264. A first end of the fourth terminal connection pattern 274 is connected to the second end of the radiation pattern 250 for short-range communication, and a second end of the fourth terminal connection pattern 274 is connected to the fourth terminal pattern 264.

Here, in the embodiment of the present disclosure, although it has been described as an example that the terminal connection pattern is composed of the first to fourth terminal patterns, the terminal connection pattern may be composed of five or more terminal patterns depending on the shape, arrangement position, or the like of the radiation pattern for short-distance communication.

Although the preferred embodiments of the present disclosure have been described above, it is understood that the present disclosure can be modified in various forms, and those skilled in the art can practice various modified examples and changed examples without departing from the scope of the claims of the present disclosure.

The invention claimed is:

1. An antenna module for wireless power transmission and reception comprising:
    a first coil wound around a first winding shaft to form a first loop, and having a first coil diameter;
    a second coil wound around an outer circumference of the first coil to form a second loop, and having a second coil diameter greater than the first coil diameter;
    a base substrate disposed to overlap at least parts of the first coil and the second coil; and
    a coil connection pattern formed on one surface of the base substrate, and connecting the first coil and the second coil,
    wherein the coil connection pattern is soldered with a second end of the first coil and a first end of the second coil, and
    wherein the first coil and the second coil are connected by the coil connection pattern, and form a loop-shaped coil for wireless power transmission and reception.

2. The antenna module for wireless power transmission and reception of claim 1,
    wherein a first end of the second coil and a second end of the first coil are spaced apart from each other, and disposed to face each other.

3. The antenna module for wireless power transmission and reception of claim 1,
    wherein the coil connection pattern is disposed on one surface facing the first coil and the second coil among an upper surface and a lower surface of the base substrate.

4. The antenna module for wireless power transmission and reception of claim 1,
    wherein the first loop is disposed in an inner circumferential area of the second loop.

5. The antenna module for wireless power transmission and reception of claim 1, further comprising:
    a first terminal connection pattern formed on the base substrate, and having a first end connected to a first end of the first coil disposed in an inner circumferential area of the first loop; and
    a second terminal connection pattern formed on the base substrate, and having a first end connected to a second end of the second coil disposed in an outer circumferential area of the second loop.

6. The antenna module for wireless power transmission and reception of claim 5, further comprising:
    a first terminal pattern formed on the base substrate, and connected to a second end of the first terminal connection pattern; and
    a second terminal pattern formed on the base substrate, and connected to a second end of the second terminal connection pattern.

7. The antenna module for wireless power transmission and reception of claim 1, further comprising: a radiation pattern formed on the base substrate, and disposed to be spaced apart from the first coil and the second coil.

8. The antenna module for wireless power transmission and reception of claim 7,
    wherein the radiation pattern has a loop shape that is wound around a second winding shaft spaced apart from the first winding shaft.

9. The antenna module for wireless power transmission and reception of claim 8, further comprising: a third terminal connection pattern formed on the base substrate, and having a first end connected to a first end of the radiation pattern; and
    a fourth terminal connection pattern formed on the base substrate, and having a first end connected to a second end of the radiation pattern.

10. The antenna module for wireless power transmission and reception of claim 9, further comprising: a third terminal pattern formed on the base substrate, and connected to a second end of the third terminal connection pattern; and
    a fourth terminal pattern formed on the base substrate, and connected to a second end of the fourth terminal connection pattern.

11. The antenna module for wireless power transmission and reception of claim 1,
    wherein the first coil is a wire having the first coil diameter smaller than that of the second coil.

12. The antenna module for wireless power transmission and reception of claim 1,
wherein the second coil is a wire having the second coil diameter greater than that of the first coil.

* * * * *